United States Patent [19]

Gnyp et al.

[11] E Re. 30,144

[45] Reissued Nov. 13, 1979

[54] APPARATUS FOR SPIN FLANGING CONTAINERS

[75] Inventors: Andrew Gnyp; Karl Elert, both of Brookfield, Wis.

[73] Assignee: Jos. Schlitz Brewing Company, Milwaukee, Wis.

[21] Appl. No.: 894,237

[22] Filed: Apr. 6, 1978

Related U.S. Patent Documents

Reissue of:

[64] Patent No.: 4,018,176
Issued: Apr. 19, 1977
Appl. No.: 304,093
Filed: Nov. 6, 1972

[51] Int. Cl.[2] ..... B21D 51/00

[52] U.S. Cl. ..... 113/16; 72/94; 113/120 AA

[58] Field of Search ..... 113/16, 7, 115, 120 AA; 72/94, 126

[56] References Cited

U.S. PATENT DOCUMENTS

| | | | |
|---|---|---|---|
| 996,122 | 6/1911 | Osborn | 72/94 |
| 2,741,292 | 4/1956 | Butters | 72/94 |
| 3,260,089 | 7/1966 | Hazelton | 72/94 |
| 3,266,451 | 8/1966 | Kraus | 113/120 AA |
| 3,270,544 | 9/1966 | Maeder et al. | 113/120 AA |
| 3,469,428 | 9/1969 | Aschberger | 72/94 |
| 3,531,967 | 10/1970 | Werge | 72/94 |
| 3,610,009 | 10/1971 | Franek | 113/120 AA |

*Primary Examiner*—Leon Gilden
*Attorney, Agent, or Firm*—Andrus, Sceales, Starke & Sawall

[57] ABSTRACT

A spin flanging machine for flanging the open end of container bodies, such as metal cans. The machine includes a drive shaft mounted for rotation on a supporting structure and a rotary turret is secured to the shaft and carries a series of flanging heads. Each head is provided with a plurality of flanging rollers which are adapted to engage the open end of the can. As the turret rotates, each head is rotated about its axis by the driving engagement of a pinion connected to the head shaft with a large fixed gear mounted on the supporting structure. The flanging heads are moved in a reciprocating manner towards and away from the can by a cam mechanism including a cam follower that is secured to the end of each head and engages a cam groove on the fixed supporting structure.

3 Claims, 5 Drawing Figures

APPARATUS FOR SPIN FLANGING CONTAINERS

Matter enclosed in heavy brackets [ ] appears in the original patent but forms no part of this reissue specification; matter printed in italics indicates the additions made by reissue.

BACKGROUND OF THE INVENTION

In the manufacture of can bodies, such as beer or soft drink cans, the open end of the can is initially necked down to a small diameter and then flanged outwardly to provide a flanged neck capable of interlocking with the can lid.

In high speed manufacturing operations, a spin flanging machine is normally used to flange the necked-down ends of the cans. The conventional spin flanging machine includes a turret which is mounted for rotation on a central drive shaft and the turret carries a series of flanging heads. Each head includes a plurality of freely rotatable flanging rollers which are adapted to engage the open end of the can to flange the same as the head is moved into engagement with the can.

During the flanging operation, the cans are supported by a star-wheel conveyor secured to the turret, and as the turret and conveyor rotate, the rotating heads are programmed to move toward the open end of the can to flange the same and to retract from the can to enable the can to be discharged from the conveyor.

Because the components of the spin flanging machine are required to provide a number of specific movements, such as rotation of the turret, rotation of the flanging heads relative to the turret, and reciprocating movement of the flanging heads relative to the turret, a complicated and costly drive mechanism has been used in the past to provide these functions.

SUMMARY OF THE INVENTION

The invention relates to a spin flanging machine for flanging the open end of container bodies, such as metal cans, and which has a simplified drive mechanism, thereby reducing the overall cost of the machine, as well as reducing maintenance and down-time.

According to the invention, a drive shaft is mounted for rotation with respect to a fixed supporting structure, and a rotary turret is secured to the shaft and carries a series of flanging heads. Each flanging head is provided with a plurality of flanging rollers which are adapted to engage the open end of a container body or can to flange the same. The cans are carried by a star-wheel conveyor that is secured to the turret and rotates with the turret.

Each of the flanging heads is rotated about its axis by a pinion which is connected to the flanging head shaft and is engaged with a large fixed gear on the supporting structure. As the drive shaft and turret rotate, the pinions associated with the various flanging heads ride on the large gear to thereby rotate the flanging heads about their axes. The flanging heads are programmed to move in a reciprocating path toward and away from the cans carried by the star-wheel conveyor by a cam mechanism which includes a cam follower that is attached to each flanging head shaft adapted to ride in a cam groove formed in the supporting structure. As the turret rotates, each follower moves along the cam groove to thereby move the respective flanging head into engagement with the can for the flanging operation and retract the flanging head from the can after the flanging operation has been completed.

As both the rotation of the flanging heads about their axes and the axial movement of the flanging heads is initiated through fixed members secured to the supporting structure, the drive mechanism is considerably simplified over that employed in conventional spin flanging machines. Simplification of the drive mechanism reduces the initial cost of the machine, as well as reducing maintenance and down-time.

With the drive system of the invention, as the speed of the main drive shaft is increased, the speed of rotation of the flanging head shafts is correspondingly increased, with the result that the flanging heads operate on each can with the same number of revolutions for each working cycle regardless of the speed of the main drive shaft. This enables the speed of the machine to be varied through a substantial range without changing the intensity of contact between the flanging rollers and the can, thus insuring uniformity of quality regardless of any variation in the speed of the machine.

With the spin flanger of the invention, no mechanism is required to hold the can bottoms against the supporting plate of the conveyor during the flanging operation, as is normally required in conventional spin flanging machines.

The speed of stripping of the cans from the flanging heads at the completion of the working cycle can be increased by utilizing an air pressure release in which a blast of air is introduced through the flanging head into the interior of the can to aid in removing the can from the flanging head.

The spin flanger of the invention utilizes seven freely rotatable flanging rollers with each flanging head and this not only produces a more uniformly flanged can, but also enables the speed of rotation of the flanging heads to be reduced and prevents any tendency of the can to rotate with the flanging head.

Other objects and advantages will appear in the course of the following description.

DESCRIPTION OF THE DRAWINGS

The drawings illustrate the best mode presently contemplated of carrying out the invention.

In the drawings.

DESCRIPTION OF THE PREFERRED EMBODIMENT

The drawings illustrate a spin flanging machine for flanging the open end or neck of a container body such as a metal can. The spin flanging machine includes a main drive shaft 1 having its ends journalled in fixed supports 2 which extend upwardly from the base 3.

Figure 1:
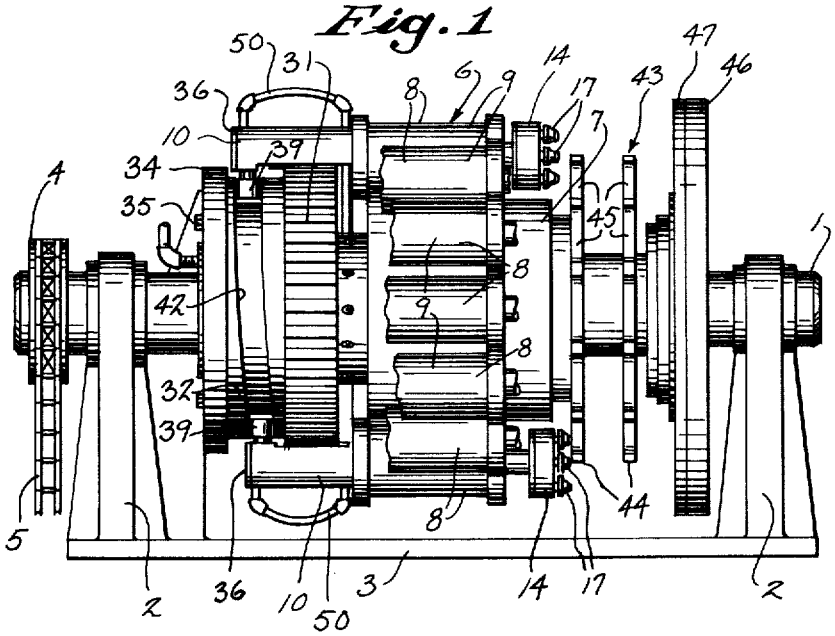
FIG. 1 is a side elevation of the spin flanging machine of the invention with parts broken away in section.

The shaft 1 is adapted to be rotated by any conventional drive mechanism, and as shown in FIG. 1, a sprocket 4 is connected to one end of the shaft and is adapted to be driven through a chain drive 5 by a motor, not shown.

A turret 6 having a central hub 7 is secured to the main drive shaft 1 and includes a series of flanging head assemblies 8 which are mounted in circumferentially spaced relation on the outer surface of the hub 7. As the turret 6 is fixed to the shaft 1, rotation of the shaft will cause rotation of the turret about the axis of shaft 1.

Figure 2:
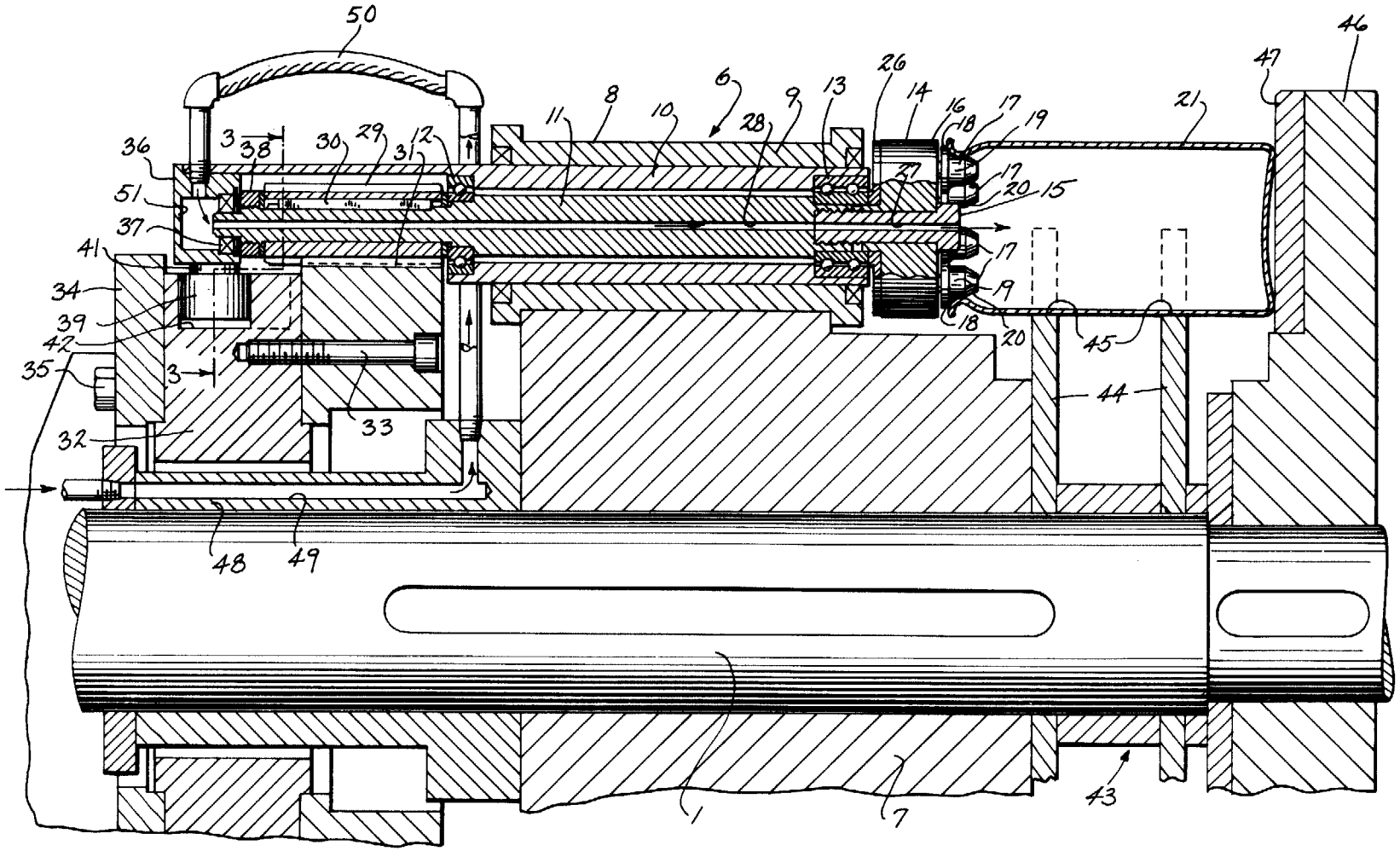
FIG. 2 is an enlarged fragmentary vertical section showing the central drive shaft and one of the flanging heads.

As best illustrated in FIG. 2, each of the flanging head assemblies 8 includes an outer generally cylindrical housing 9 and a sleeve 10 is located within each housing and the rear end of the sleeve projects a substantial distance beyond the housing.

A flanging head shaft 11 is mounted for rotation within each sleeve 10 by a pair of bearing assemblies 12 and 13, and a flanging head 13 is secured to the forward end of each shaft 11 by a central bolt 15.

Figure 5:
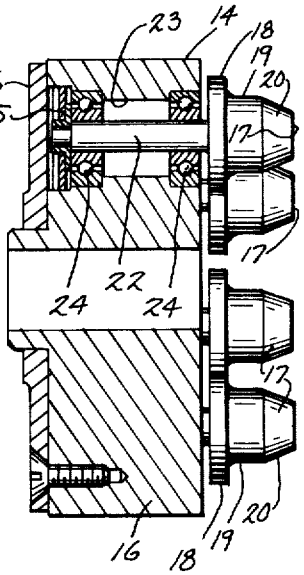
FIG. 5 is an enlarged transverse section of one of the flanging head bodies.

As best shown in FIG. 5, each flanging head 14 includes a generally cylindrical body 16 and a plurality of flanging rollers 17 are journalled for rotation on the body 14. Each of the flanging rollers 17 includes an inner base ridge 18, a central cylindrical portion 19 and an outer tapered tip 20. In the flanging operation the tapered outer end 20 serves as a guide to guide the roller into the can while the ridge 18 engages the edge of the can 21 to deform the same outwardly and provide the flange.

Each of the flanging rollers 17 is provided with a shank 22 (See FIG. 5) which is journalled for rotation within an opening 23 in the body 16 by a bearing assembly 24. In addition, the inner end of each shank 22 is provided with a shoulder which engages a thrust bearing 25 attached to the plate 26 that is secured to the inner surface of the body 16.

As best illustrated in FIG. 2, the bolt 15 which connects the flanging head 14 to the shaft 11 is provided with a central opening 27 which communicates with an axial passage 28 formed in the shaft 11.

The passage 28 and opening 27 provide a conduit for conducting compressed air or other gas to the interior of the can 21 to strip the can from the flanging head 14, as will hereinafter be described.

Each of the flanging heads 14 is adapted to be rotated about its axis as the turret 6 rotates about the axis of the main drive shaft 1. To provide the rotation for each head 14, a pinion 29 is secured to the outer end of the head shaft 11 by a key 30. Each of the pinions 29 is engaged with a fixed large gear 31. As best shown in FIG. 2, gear 31 is secured to a cam plate 32 by a series of bolts 33 and cam plate 32 is connected to a supporting plate 34 by bolts 35. The supporting plate 34, in turn, is connected to the base 3. With this construction, as the turret rotates, each of the pinions 29 associated with the flanging head shafts 11 will engage the fixed large gear 31 to thereby rotate the shafts 11 about their axes.

A cap 36 is secured to the rear end of each sleeve 10 and the end of the shaft 11 is sealed with respect to the internal surfaces of the cap by a sealing ring 37. A nut 38 is threaded on the end of the shaft 11 and is located between the seal 37 and the pinion 29, as shown in FIG. 2.

Figure 3:
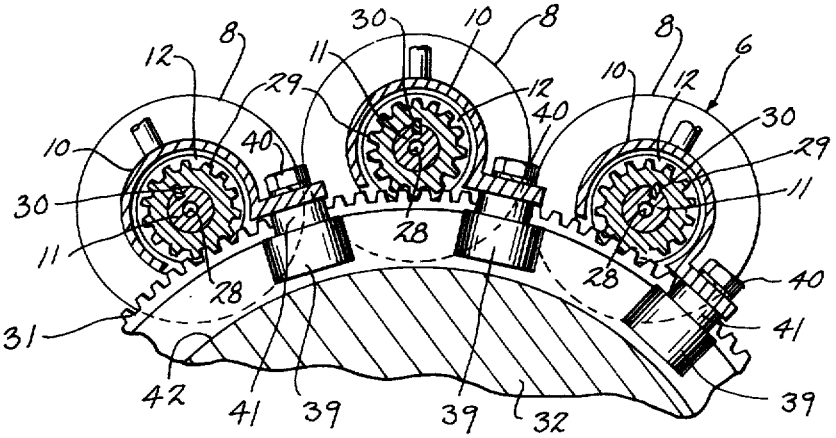
FIG. 3 is a section taken along line 3—3 of FIG. 2.
Figure 4:
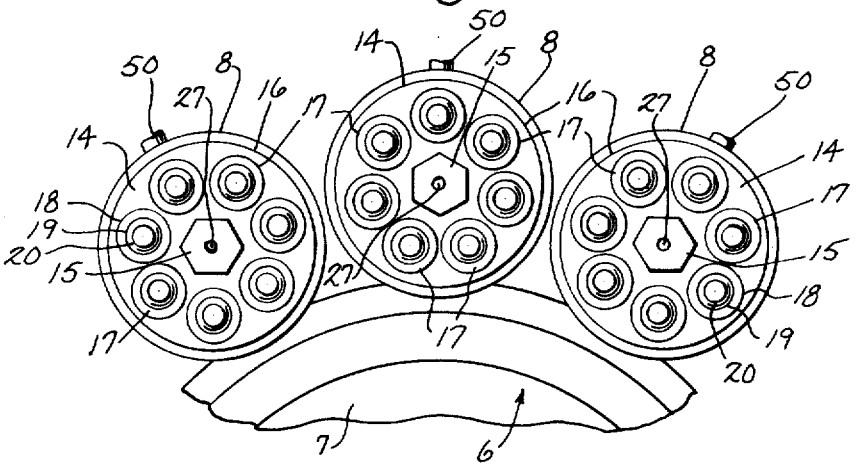
FIG. 4 is a section taken along line 4—4 of FIG. 2.

To move each flanging head 14 toward and away from the respective can 21 is programmed sequence, a cam mechanism is utilized which includes a cam follower 39 having a shank which is secured to a flange on cap 36 by means of a nut. A spacer 41, as illustrated in FIG. 3, is interposed between the cap flange and the follower.

Each of the followers 39 is adapted to ride within a cam groove 42 formed in the cam plate 32 as the turret 6 rotates. The groove 42 is provided with a contour such that each flanging head 14 is sequentially moved toward the can 21 to provide the flanging operation and is then withdrawn from the can after the flanging has been completed.

During the flanging operation, each can 21 is supported by a star-wheel transferer 43 which is secured to the main drive shaft and rotates with the turret 6. The star-wheel transferer 43 includes a pair of spaced plates 44 having a series of peripheral recesses or pockets 45 which receive the cans. The cans can be introduced into the pockets 42 of the star-wheel transferer 43 either by a gravity feed system or by a suitable conveyor system. After the flanging operation, the cans 21 will fall by gravity from the pockets 45 of the star-wheel transferer.

In the flanging operation the bottoms of the can 21 bear against a support plate 46 which is secured to the main driveshaft 1 and rotates with the shaft. A wear ring 47 can be secured to the face of the support plate and serve as a thrust surface for cans.

In order to facilitate removal or stripping of each can 21 from the respective flanging head 14 a pressurized gas can be introduced into the interior of the can after the flanging operation. To provide the pressurized gas system, a sleeve 48 is secured around the shaft 1 inwardly of the large gear 31 and cam plate 32 and the sleeve is provided with axial passages 49 that are connected to a suitable source of pressurized gas. Each passage 49 is connected by a hose 50 to a chamber 51 in one of the caps 36. Each chamber 51 communicates with the central passage 28 in shaft 11, which in turn is connected to the opening 27 in bolt 15, so that the gas can pass through the shaft 11 and bolt 15 to the interior of the can 21. The gas supply system is operated in programmed sequence with the flanging operation so that the gas will be supplied to the can as the flanging head is withdrawn from engagement with the can. The blast of gas discharged into the can prevents the can from following the return movement of the flanging head and maintains the bottom of the can in engagement with the support plate 46.

The drive mechanism of the spin flanging machine of the invention is substantially simplified over the drive mechanism normally used in spin flanging machines. Both the rotary motion for the flanging heads 14 and the reciprocating motion for the heads is activated by stationary members, namely the stationary gear 31 and the stationary cam 32. As the drive mechanism is simplified, the initial cost of the machine is reduced over that of conventional units and maintenance expense and down-time is also decreased.

With the drive system of the invention an increase in speed of the central drive shaft 1 will also result in a corresponding increase in speed of the flanging head shafts 11 and thus, each flanging head 14 will engage the respective can for the same number of working revolutions regardless of the speed of the main drive shaft. This insures a more uniformly flanged product regardless of the speed of operation of the machine.

With the unit of the invention no mechanism is required to hold the cans 21 against the plate 46, for the cans are held merely by frictional contact. The gas supply system which blasts pressurized air into the interior of the can after the flanging operation insures that the cans will not follow the flanging heads on the return stroke and will retain the can bottoms in engagement with the support plate 46 after the flanging operation has been completed.

Various modes of carrying out the invention are contemplated as being within the scope of the following claims particularly pointing out and distinctly claiming the subject matter which is regarded as the invention.

We claim:

1. A machine for spin flanging the open ends of containers comprising, a supporting structure, a drive shaft mounted for rotation with respect to the supporting structure, a turret secured to the drive shaft and disposed to rotate with the drive shaft, container holding means carried by the turret for holding the containers during the spin flanging operation, a series of flanging heads carried by the turret, each flanging head being mounted for rotation about its axis and being mounted for reciprocating axial movement with respect to the turret, a fixed drive gear mounted on the supporting structure and disposed concentrically of said drive shaft, each flanging head including a series of circumferentially spaced freely rotatable flanging rollers disposed to engage the open end of the container to flange the same, a pinion connected to each flanging head and operably engaged with said gear to rotate the flanging heads about their axes as the turret rotates, each pinion and the respective gear having substantially different axial lengths to enable the pinion to move axially with respect to the gear and maintain a driving connection therebetween when the head is moved axially with respect to the turret, cam means interconnecting each flanging head and the supporting structure for moving the flanging heads axially with respect to the turret in programmed sequence to thereby move the heads toward and away from the containers being held by said container holding means, gas supply means for introducing a gas under pressure through each flanging head and into the interior of the container to aid in stripping the container from the flanging head as the head is moved away from the container after the flanging operation, each flanging head includes a flanging head shaft journalled with respect to the turret, said gas supply means includes a chamber in said turret and communicating with a source of gas under pressure, and a passage located axially of each flanging head shaft and communicating with said chamber for conducting gas to the interior of each container.

*2. A machine for spin flanging the open ends of containers comprising, a supporting structure, a drive shaft mounted for rotation with respect to the supporting structure, a turret secured to the drive shaft and disposed to rotate with the drive shaft, container holding means for holding the containers during the spin flanging operation, a series of flanging heads carried by the turret, each flanging head including a flanging head shaft journalled for rotation about its axis and each flanging head including a series of circumferentially spaced freely rotatable flanging rollers disposed to engage the open end of a container to flange the same, means to rotate the flanging heads about their axes as the turret rotates, means for providing relative movement between the flanging heads and said container holding means to effect engagement of the heads and the respective containers being held by the container holding means and to effect disengagement thereof, gas supply means including a chamber in each head for introducing a gas under pressure through each flanging head and into the interior of the container to aid in stripping the container from the flanging head as the head is disengaged from the container after the flanging operation.*

*3. A machine for spin flanging the open ends of containers, comprising a supporting structure, a drive shaft mounted for rotation with respect to the supporting structure, a turret secured to the drive shaft and disposed to rotate with the drive shaft, container holding means for holding the containers during the spin flanging operation, a series of flanging heads mounted on the turret, each flanging head including an outer tubular body and an internal shaft journalled for rotation about its axis with respect to the body, each shaft having an internal passage extending to the outer end thereof, each flanging head also including a series of circumferentially spaced freely rotatable flanging rollers mounted on the outer end of the shaft and disposed to engage the open end of a container held by the container holding means to flange the same, means to rotate the flanging head shafts about their axes as the turret rotates, means for providing relative movement between the flanging heads and the container holding means to effect engagement of the heads and the respective containers being held by the container holding means and to effect disengagement thereof, each flanging head including a sealed chamber in said body communicating with the passage in said flanging head shaft, and a gas supply conduit for introducing a gas under pressure into each chamber, said gas flowing through the respective passage to aid in stripping the container from the flanging head as the head is disengaged from the container after the flanging operation.*

* * * * *